United States Patent [19]
Yukita et al.

[11] Patent Number: 4,747,203
[45] Date of Patent: May 31, 1988

[54] PRODUCTION METHOD FOR BALL SUPPORT STRUCTURES

[75] Inventors: Hisashi Yukita; Hisanobu Kanamaru, both of Katsuta; Masaharu Okazaki, Kanasago, all of Japan

[73] Assignee: Hitachi, Ltd., Tokyo, Japan

[21] Appl. No.: 48,723

[22] Filed: May 11, 1987

[30] Foreign Application Priority Data

May 14, 1986 [JP] Japan ............................... 61-108505

[51] Int. Cl.⁴ .............................................. B23P 15/10
[52] U.S. Cl. .................................. 29/439; 29/441 R; 29/149.5 B
[58] Field of Search ............... 29/441 R, 441 BP, 439, 29/149.5 B, 521; 403/39, 122

[56] References Cited

U.S. PATENT DOCUMENTS

| | | | |
|---|---|---|---|
| 1,767,107 | 6/1930 | Yates | 29/148.4 C |
| 3,253,330 | 5/1966 | Davies | 29/441 R |
| 3,736,635 | 6/1973 | Romer et al. | 29/441 R X |
| 4,109,364 | 8/1978 | Wisner | 29/441 R X |
| 4,453,300 | 6/1984 | Klimek et al. | 29/441 R X |

FOREIGN PATENT DOCUMENTS 113711 7/1982 Japan.

Primary Examiner—Timothy V. Eley
Attorney, Agent, or Firm—Antonelli, Terry & Wands

[57] ABSTRACT

A ball support structure comprises a ball and a ball support movably holding the ball. The ball support is formed with a ball receiving recess defined by a semispherical portion and a cylindrical portion. A through hole aligning with the ball receiving recess and passing through the ball support is formed. The ball is disposed in the ball receiving recess of the ball support and then the ball support is axially pressed at the peripheral of the ball receiving recess so that metal of part of the ball support flows to contact with the ball thereby to provide a partially spherical portion. The ball is pushed by a rod through the through hole when the partially spherical portion is formed, so that the ball and the semispherical portion has a small gap.

10 Claims, 5 Drawing Sheets

PRODUCTION METHOD FOR BALL SUPPORT STRUCTURES

BACKGROUND OF THE INVENTION

This invention relates to a production method for ball support structures suitable for the use in ball joints, spherical bearings, etc.

An example of conventional ball support structures used in ball joints comprises a joint member or a ball support and a shaft provided with a ball at an end thereof. The joint member has a thin cylindrical portion projecting into one side of the joint member from around a recess formed for receiving the ball. The thin cylindrical portion is caulked to cover part of the ball after the ball is fitted on the recess so that the ball is prevented from being pulled out from the joint member. Another example of the ball support structure is disclosed in Japanese Utility-Model Laid-Open No. 57-113711/1982 in which a ball joint socket receives a ball of a ball stud, a ball seat is disposed on the ball of the ball stud, and then a part of the ball joint socket is caulked to press the ball seat on the ball, so that the ball is held by the ball joint socket and the ball seat.

In the former example of the conventional ball support structures, using the thin cylindrical portion for holding the ball, the cylindrical portion which is limited in the thickness is only covered on the ball. Therefore, the structure is weak in pulling-out strength and relatively large play occurs between the ball and the joint member receiving the ball when the ball is pulled from the joint member. In particular, when the ball support structure is used as a ball joint mechanism of piston and a connecting rod, a large pulling force acts on the ball support member every time the piston reciprocates. Therefore, the play between the ball and the ball support member increases according to the lapsed time of the operation.

In the latter example of the conventional ball support structures which employ the ball seats, there is left the problem that the number of structural parts increases, and the structure is complicated.

SUMMARY OF THE INVENTION

An object of the present invention is to provide a production method for ball support structures which are excellent in mechanical strength, simple in construction and able to reduce in cost.

The present invention resides in a production method for the ball support structures, which method comprises the steps of:

forming in a first member a ball-receiving recess having a semispherical portion and a cylindrical recess opening portion continuously extending from an end of the semispherical portion;

forming a through hole in the first member on the opposite side to the cylindrical recess opening;

inserting a ball portion of a second member in the ball-receiving recess;

axially pressing the first member around the cylindrical recess opening so as to form an annular flat recess around the cylindrical recess opening thereby to provide a partially spherical contact portion contacting the ball portion at the cylindrical recess opening through metal flow; and axially pushing the ball portion of the second member from the opposite side to the second member inserting direction so as to slightly separate axially the second member from the first member.

The partially-spherical contact portion formed by a punch having an annular flat pressing face is excellent in resistance against pulling-out of the ball portion from the first member, and the partially-spherical contact portion has a sufficient contact area by pushing the ball portion from the opposite side to the second member inserting direction and is made free from extra tightness between the first and second members.

DETAILED DESCRIPTION OF THE INVENTION

Figure 1A:
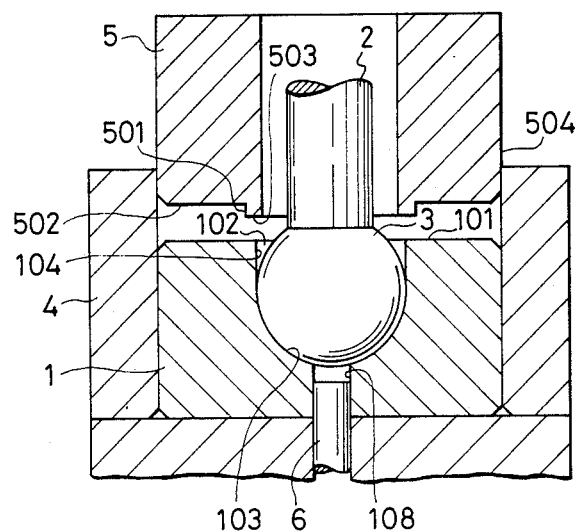
FIGS. 1a and 1b each are a sectional view of production apparatus and ball support structure for explaining an embodiment of a production method according to the present invention.
Figure 1B:
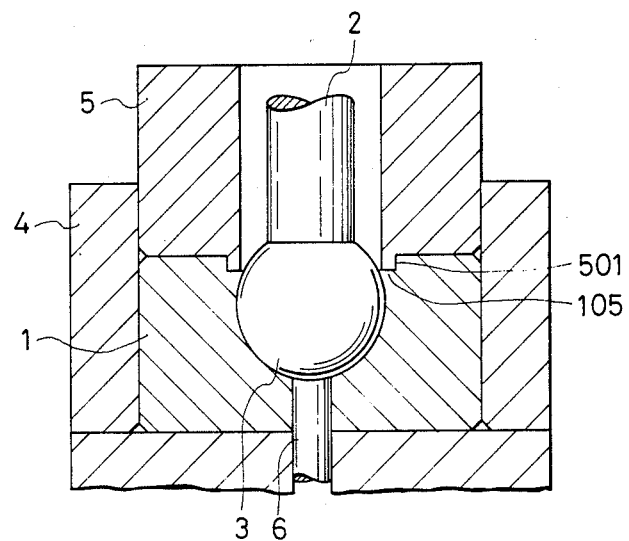
Figure 2:
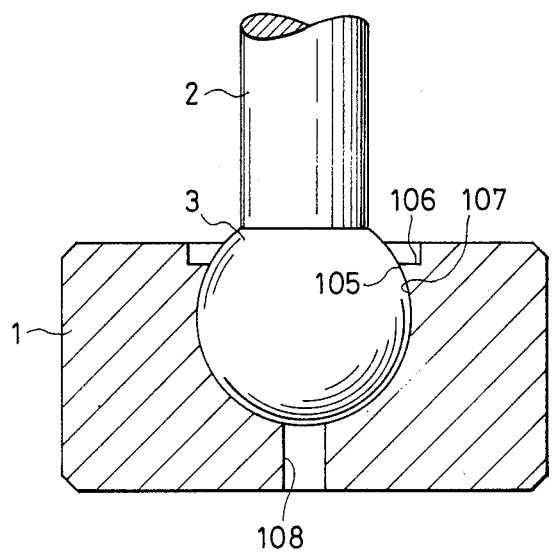
FIG. 2 is a sectional view of a ball support structure produced according to the present invention.
Figure 3:
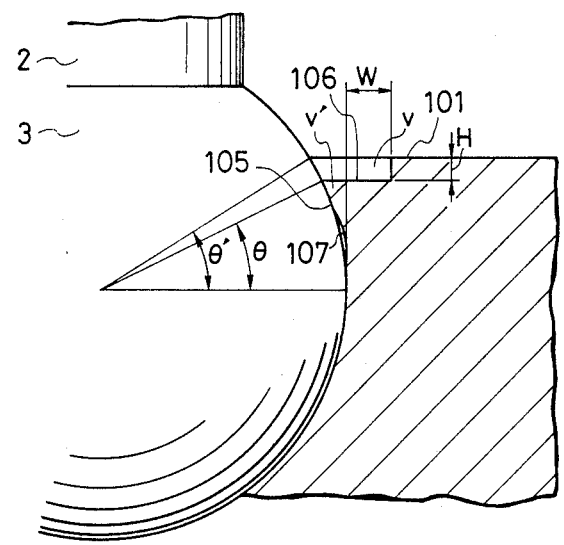
FIG. 3 is an enlarged view of part of FIG. 2.

A production method for a ball support structure according to the present invention is described hereunder in detail taking a ball joint as an example, referring to FIGS. 1 to 3.

A ball support structure as a ball joint is constructed as shown in FIG. 2, that is, it comprises a joint member 1 or a ball support and a shaft 2 securing a ball 3 at one end thereof.

Referring to FIG. 1a, the ball support 1 has a sufficient thickness and a flat surface portion 101 on one side. The ball support 1 is formed with a recess 102 for receiving the ball 3 on the side of the flat surface portion 101. The ball receiving recess 102 is defined by a semispherical surface 103 and a cylindrical surface 104 extending continuously from the end of the semispherical surface 103 to the flat surface portion 101. The ball support 1 is further provided with a relatively small through hole 108 the axis of which substantially aligns with the axis of the ball-receiving recess 102. The ball support 1 is made of high strength aluminum which is widely used in the field of the ball joint.

The shaft 2 with the ball 3 is formed by forming a hole in the ball 3 and fixedly inserting the shaft end in the hole. The shaft 2 and ball 3, however, may be formed by one piece. The ball 3 is made of steel for bearing, and formed spherically.

The ball receiving recess 102 of the ball support 1 is made slightly larger in scale than the ball 3, that is, the diameter of the cylindrical surface 104 is made slightly larger than that of the ball 3 and the semispherical surface 103 is made to rotatably receive the ball 3. The depth of the ball receiving recess 102 is determined so that an upper portion of the ball 3 is slightly exposed out of the ball receiving recess 102, that is, the depth is smaller than the diameter of the ball 3.

The ball support structure 1 is produced as follows:

The ball support 1 is set in a guide portion 4 of a press mechanism and then the ball 3 is disposed in the ball receiving recess 102. A punch 5 of the press mechanism has an annular tooth 501 projecting from a flat face 502. The tooth 501 is cylindrical and has a substantially flat end 503. The press mechanism is further provided with a pushing rod 6 to push the ball 3 from the bottom side through the through hole 108 of the ball support 1.

The press mechanism is driven so that the punch 5 goes down while an outer side 504 of the punch 5 is being guided by the guide portion 4 to press vertically the ball support 1 at a peripheral portion of the cylindrical surface 104 or an opening of the ball receiving recess 102 as shown in FIG. 1b. The ball support 1 pressed thus is partially deformed through metal flow so that part of the ball support 1 contacts with the outer surface of the ball 3, thereby to form a partially-spherical portion 105 as shown in FIGS. 2 and 3. This portion prevents the ball 3 from being pulled out.

The press mechanism operates the pushing rod 6 to push the ball 3 so as to provide a small gap between the outer surface of the ball 3 and the semispherical surface 103 of the ball receiving recess 102 of the ball support 1. The operation of the pushing rod 6 can be done at the same time as the punch 5, the pushing rod 6 can be operated to keep the ball slightly raised from the semispherical surface 103 prior to deformation of the ball support 1 by the punch 5 and then deform, which is most preferable, or the pushing rod 6 can be operated after effecting the deformation of the ball support 1 by the punch 5, so as to slightly raise the ball 3 from the semispherical surface 103.

Thus formed ball support structure 1 is shown in FIGS. 2 and 3. An annular flat recess 106 is formed around the opening of the ball receiving recess 102. When the annular flat recess 106 is formed, metal of the ball support 1 at the annular flat recess 106 is displaced by metal flow to contact with the ball 3, so that the partially-spherical portion 105 is formed. Large deformation of the annular flat portion 106 makes a large partially-spherical portion 105 which is large in contact surface area. The large contact surface area reduces contact pressure caused by pulling out the ball 3 from the ball receiving recess 102 of the ball support 1. The large deformation of the annular flat portion 106 makes a tight joint between the ball 3 and the ball support 1. The tight joint prevents the ball 4 from rotatably moving in the ball receiving recess 102. The ball pushing by the pushing rods 6 upon the formation of the partially-spherical portion 105 makes the partially-spherical portion 105 which can allow the ball 3 to rotate sufficiently in the ball receiving recess 102, while having a sufficient contact surface area.

All the inner surface of the cylindrical surface portion of the recess 102 is not contacted with the ball 3 by pressing with the punch 5. A part 107 is left uncontacted to form a small gap between the ball 3 and the cylindrical surface 104. When the punch 5 presses the ball support 1, metal flow starts to take place at the opening portion of the recess 102, and the portion of the ball support 1 contacting with the ball 3 due to deformation caused by the punch 5 extends downward from the upper side. The pressing operation by the punch 5 is stopped when the above-mentioned small gap is left.

This can be effected for example, by pressing the ball support 1 until the flat portion 502 of the punch 5 contacts the flat surface portion 101 of the ball support 1. When the punch 5 presses the ball support 1 until any small gap is not left, the ball 3 is jointed to the ball support 1 too hard to move. Existence of the small gap reduces friction between the ball support 1 and ball 3, so that the ball can be suitably moved.

The partially spherical portion formed by pressing with the punch 5 having the annular flat tooth 501 the pressing face of which is substantially perpendicular to the axis of the ball receiving recess 102 has a large resistance against pulling out of the ball 3 from the ball support 1.

FIG. 3 shows a dimensional relation of the ball support structure as the ball joint. It is preferable to produce the ball support structure under the following dimensional relation.

An angular position $\theta$ of the annular flat surface 106 of the ball support 1 against the ball 3 disposed in the ball receiving recess 102 is 20° to 40°. When the angular position $\theta$ is larger than 40°, movement of the ball 3 in the ball receiving recess 102 is restricted by the shaft 2, and when less than 20° it is difficult to obtain a sufficient resistance against the pulling out of the ball 3 from the ball support 1. A sectional area V to be pressed which is nearly equal to a deformed sectional area V' is equal to W·H, wherein W is a pressing width and H is a depth to be deformed by the punch 5. The deformation of the ball support 1 can be determined by controlling the struke of the punch 5. An angular position $\theta'$ of the flat surface 101 of the ball support 1, that is, an angular position $\theta'$ before the deformation against the ball 3 is $\theta + (2 \text{ to } 8)°$, wherein $\theta$ is an angular position of the annular flat portion 106 of the ball support 1. The angular position $\theta'$ is determined according to a required pull out resistance.

Figure 4A:
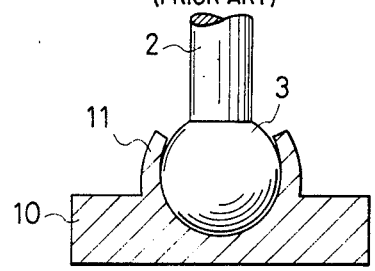
FIG. 4a is a sectional view of a conventional ball support structure.
Figure 4B:
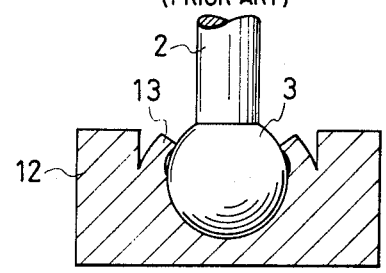
FIG. 4b is a sectional view of a ball support structure formed for comparison.

FIGS. 4a and 4b show ball support structures for ball joints which are made for comparison of resistance against the pulling out of balls from ball supports.

In FIG. 4a, a ball support 10 has a thin cylindrical portion 1 projecting upward. The thin cylindrical portion 11 is caulked by a tool after the ball 3 with the shaft 2 is inserted in a ball receiving recess formed in the ball support 10. This production method is conventional as described in the background of the invention. In FIG. 4b, a ball support 12 is similar to the ball support 1 previously mentioned. The ball support 12 is deformed by a tool with a knife edge so that a part 13 of the ball support 12 covers the upper portion of the ball 3, whereby the ball 3 is prevented from pulling out.

Figure 5:
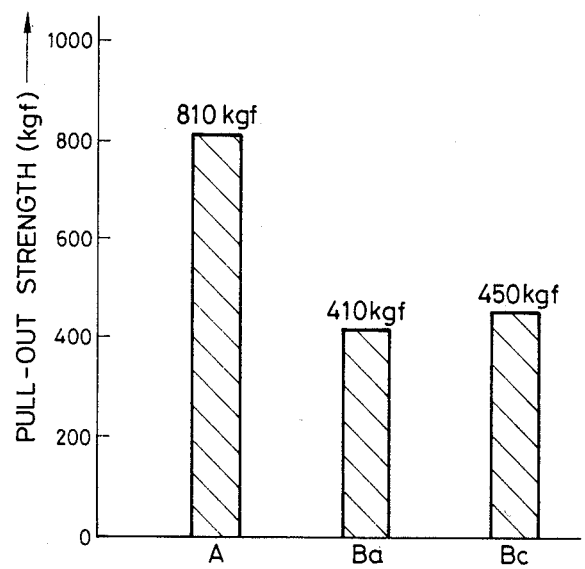
FIG. 5 is graphical illustration showing pull-out strength.

FIG. 5 shows the results of pulling out tests in which A shows pull-out strength of a ball support structure produced according to the present invention, Ba and Bc show the pull-out strength of the ball support structures made for comparison as shown in FIGS. 4a and 4b, respectively. All the balls 3 and the shafts 2 are made the same in scale and material. It is noted that the pull-out strength (kgf) (which is resistance against pulling out of the ball 3 from the ball support) is very excellent as compared with the other ball support structures made for comparison.

The ball support structures shown in FIGS. 4a and 4b have thin cylindrical portions 11, 13 made for preventing the balls 3 from pulling out from the ball supports 10, 12. The cylindrical portions 11, 13 are likely to easily reinstated when the balls 3 are pulled. On the other hand, the ball support structure according to the present invention has partially spherical portion 105 which is difficult to be reinstated, so that the pull-out strength is raised.

According to the present invention, any shape of the ball support 1 can be used and the ball support structure can be made without increasing the number of parts. Working of the spherical portion is sufficient to be made on the only one piece, so that the structure can be simplified and productivity can be improved.

Figure 6:
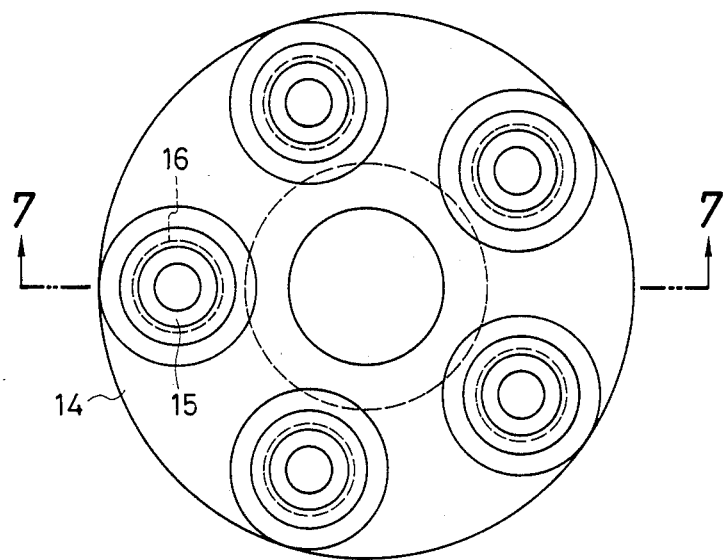
FIG. 6 is a plane view of a swash plate of a variable capacity axial piston compressor.
Figure 7:
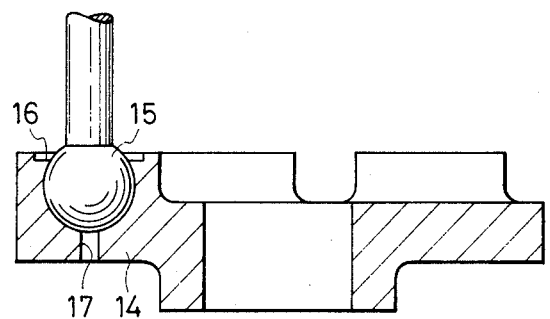
FIG. 7 is a sectional view taken along a line 7—7 of FIG. 6.

FIGS. 6 and 7 show an application of the ball support structure to a ball joint structure of a swash plate used in a variable capacity axial piston compressor. The swash plate 14 has a plurality of ball receiving recesses in each of which a ball 15 provided at one end of a connecting rod is inserted and each of which is deformed at the position 16 around the opening thereof as described in the above embodiment and the ball 15 is pushed by the pushing rod 6 passing through a through hole 17, so that the ball 15 can be smoothly moved and the swash plate 14 has large pull-out strength. All the balls 15 can be assembled once by the press mechanism.

Figure 8:
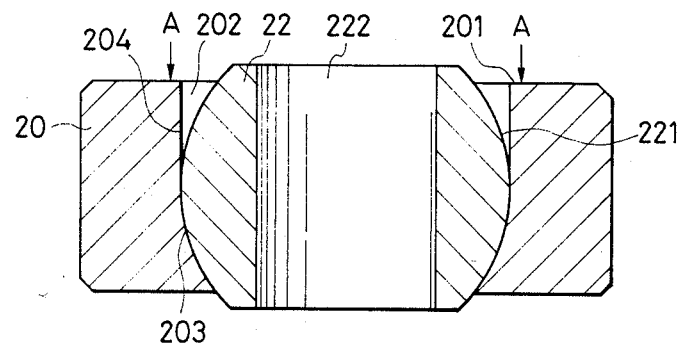
FIG. 8 is a sectional view of a bearing before assembling.
Figure 9:
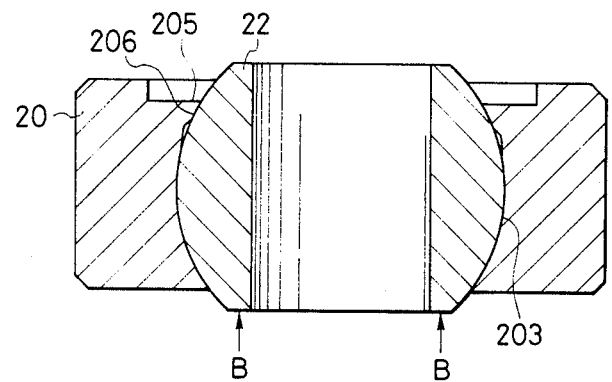
FIG. 9 is a sectional view of the bearing assembled according to the present invention.

FIGS. 8 and 9 show a ball support structure used as a spherical bearing.

The ball support structure comprises a ball support 20 and a ball 22. The ball support 20 has a ball receiving recess 202 defined by a semispherical portion 203 having a relatively large hole, and a cylindrical portion 204. The ball 22 has an outer semispherical surface 221 and a hole 222 for receiving a shaft. After the ball 22 is inserted in the ball receiving recess 202, the boundary of the cylindrical portion is deformed by vertically pressing as shown by arrows A using a punch having an annular flat pressing face so that an annular flat groove 205 is formed to form a partially spherical portion through metal flow of the part of the ball support. When the deformation is effected, the ball 22 is pushed up as shown by arrows B so that a small gap will be made between the ball 22 and the semispherical surface portion 221 of the ball support 20. In thus formed ball support structure, the ball 22 can be smoothly moved in the ball receiving recess 202 and the ball support 20 has a large resistance against the pulling out of the ball 22 from the ball support 20. In this case, it is preferable that the ball is kept to be slightly raised and then the ball support is deformed by pressing as shown by arrows A. In this case, a small gap 206 is formed.

The through hole 108 can be used for lubrication oil passage.

We claim:

1. A production method for ball support structures, which method comprises the steps of:
    forming in a first member a ball-receiving recess having a semispherical portion and a cylindrical recess opening portion extending from an end of said semispherical portion;
    forming a through hole in said first member on the opposite side to said cylindrical recess opening;
    inserting a ball portion of a second member in said ball-receiving recess;
    axially pressing said first member around said cylindrical recess opening so as to form an annular flat recess around said cylindrical recess opening thereby to provide a partially spherical contact portion contacting said ball portion at said cylindrical recess opening; and
    axially pushing said ball portion of said second member from the opposite side to the second member inserting direction so as to slightly separate axially said second member from said first member.

2. The production method as defined in claim 1, wherein said second member is made of bearing steel and said first member is made of material softer than said second member.

3. The production method as defined in claim 2, wherein said second member is pushed axially by a pushing rod passing through said through hole formed in said first member.

4. The production method as defined in claim 3, wherein said second member comprises said ball portion and a shaft portion connected to said ball portion.

5. The production method as defined in claim 3, wherein said first member is pressed using a punch having an annular flat tooth so that said tooth deforms the peripheral portion of said cylindrical recess opening in an annular flat recess to provide said partially-spherical contact portion near said annular flat recess.

6. A production method for ball support structures, which comprises the steps of:
    preparing a first member having a substantially flat surface portion;
    forming a ball-receiving recess in said first member on the side of said flat surface portion, said ball-receiving recess having a semispherical surface and a cylindrical surface extending from an end of said semispherical surface to said flat surface portion and said cylindrical surface providing a ball-receiving recess opening;
    forming a through hole in said first member such that an axis of said through hole aligns with an axis of said ball receiving recess;
    preparing a second member having a ball portion the spherical surface of which is slightly smaller in scale than said semispherical surface of said first member so that said ball portion can rotatably fit in said ball-receiving recess;
    inserting said ball portion of said second member in said ball-receiving recess of said first member;
    pressing said flat surface portion of said first member around said ball-receiving recess opening in a perpendicular direction to said flat surface with a punch having an annular, substantially flat pressing face so that a part of said first member is deformed thereby to provide a partially spherical contact portion at said ball-receiving recess opening;
    axially pushing said ball portion of said second member through said through hole of said first member from the opposite side to an inserting direction of said second member, thereby to provide said partially spherical contact portion having a sufficient contact area and being free from extra tightness.

7. The production method as defined in claim 6, wherein said first member is softer than said ball portion of said second member.

8. The production method as defined in claim 7, wherein said punch is pressed until the flat portion of said punch from which said tooth projects contacts said flat surface portion of said first member.

9. The production method as defined in claim 7, wherein said second member is axially pushed by a pushing rod passing through said through hole made in said first member.

10. The production method as defined in claim 7, wherein a pushing rod is provided so as to keep said second member to be slightly raised from said first member, said second member is inserted in said ball receiving recess and disposed on said pushing rod, and said first member is deformed by said punch.

* * * * *